May 17, 1949. E. J. CONSIER 2,470,390
AUTOMATIC VARIABLE SPEED TRANSMISSION DEVICE
Filed Nov. 26, 1945 3 Sheets-Sheet 1

INVENTOR.
Edward J. Consier.
BY
Stanley Lightfoot

May 17, 1949.  E. J. CONSIER  2,470,390
AUTOMATIC VARIABLE SPEED TRANSMISSION DEVICE
Filed Nov. 26, 1945

INVENTOR.
Edward J. Consier
BY
Stanley Lightfoot

May 17, 1949.　　　　　E. J. CONSIER　　　　2,470,390
AUTOMATIC VARIABLE SPEED TRANSMISSION DEVICE
Filed Nov. 26, 1945　　　　　　　　　　　3 Sheets-Sheet 3

INVENTOR.
Edward J. Consier
BY
Stanley Lightfoot

Patented May 17, 1949

2,470,390

UNITED STATES PATENT OFFICE 2,470,390

AUTOMATIC VARIABLE-SPEED TRANSMISSION DEVICE

Edward J. Consier, Detroit, Mich.

Application November 26, 1945, Serial No. 630,878

3 Claims. (Cl. 74—751)

This invention relates to automatic variable speed transmission and comprises employing worm gearing in a novel way in combination with a rack, pinion and spring connection between racks and worm gears wherein the spring and rack causes worm speed change and the intercepting of more of the direct speed of the motor as load conditions vary until the speed transmission process becomes a direct positive drive system.

It is an object of the said invention to provide an arrangement and combination producing a smooth, gradual fast acceleration over a wider range of ratio in a simpler manner requiring a smaller amount of space and with a minimum amount of gearing in comparison with spur gear transmissions as heretofore known.

It is more particularly an object of this invention to provide a transmission that will apply ample starting torque and automatically change to a direct drive condition.

Since the main idea in the invention consists of means and arrangements for a changing worm gear speed to change the proportion of rotation of the worm relative to the drive shaft, it is not beyond the scope of the invention to employ other types of gear design or arrangements to modify worm speed in place of the preferred hypoid arrangement.

It is also not beyond the scope of the invention to employ a different type of spring action, or to use a pneumatic or hydraulic means in place of springs.

It is also not beyond the scope of the invention to employ a different type of rack action or means for rack action control in the auxiliary member of the assembly.

Further objects or advantages auxiliary or subsidiary to the aforesaid objects, or resulting from the construction or operation of the invention as it may be carried into effect, will become apparent as the said invention is hereinafter further disclosed.

In carrying the said invention into effect, I may adopt the novel construction and arrangement of parts hereinafter further described and illustrated, by way of example, having reference to the accompanying drawings wherein.

Figure 1:
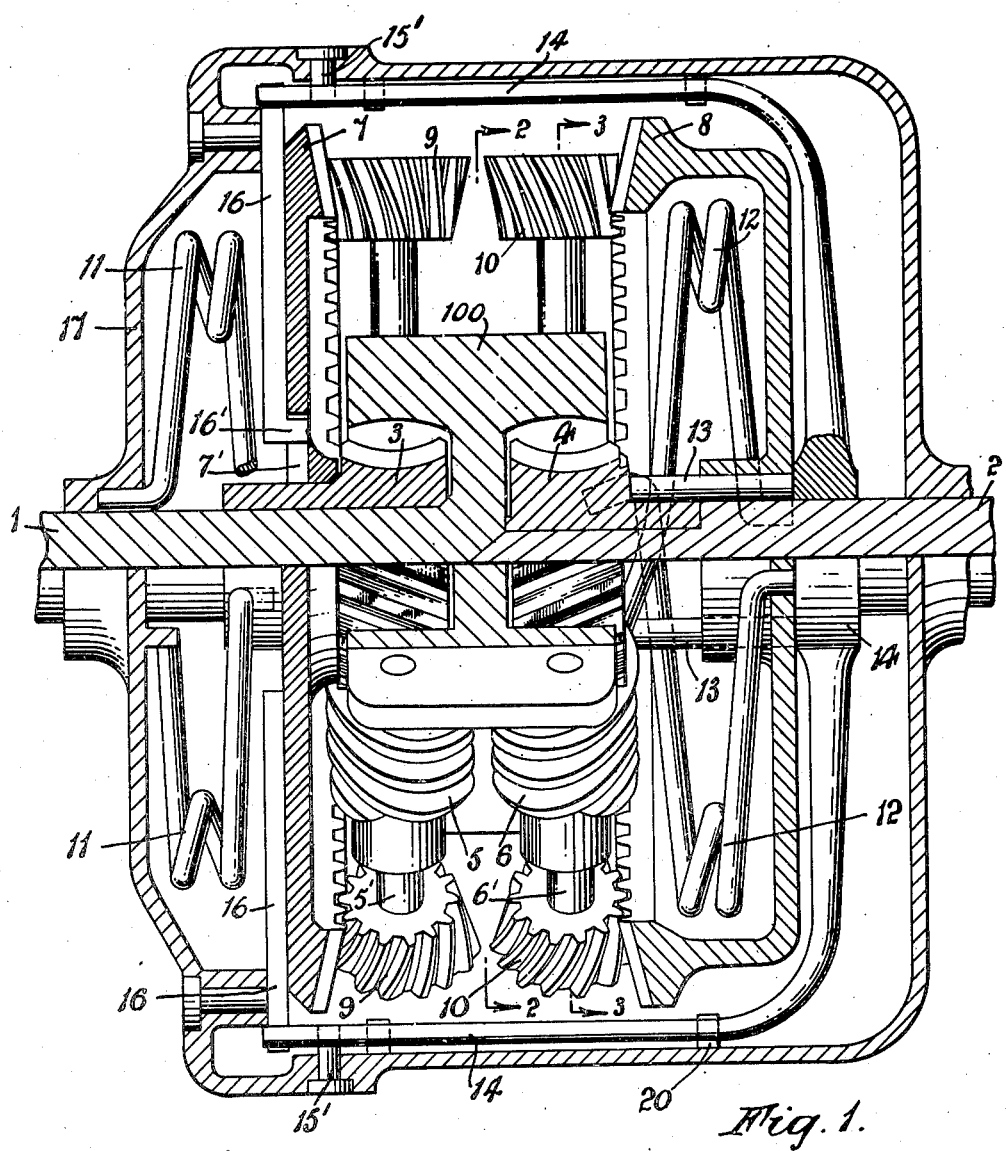
Figure 1 is a sectional elevation of a transmission embodying the said invention, the section being taken on planes indicated by the line 1—1 in Figure 3.
Figure 5:
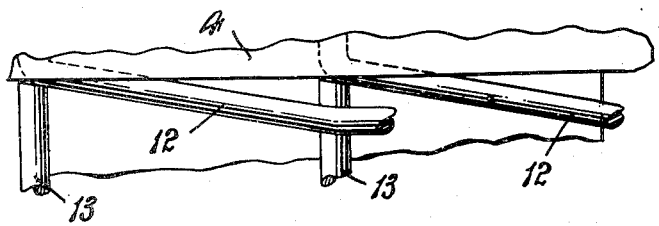
Figure 4:
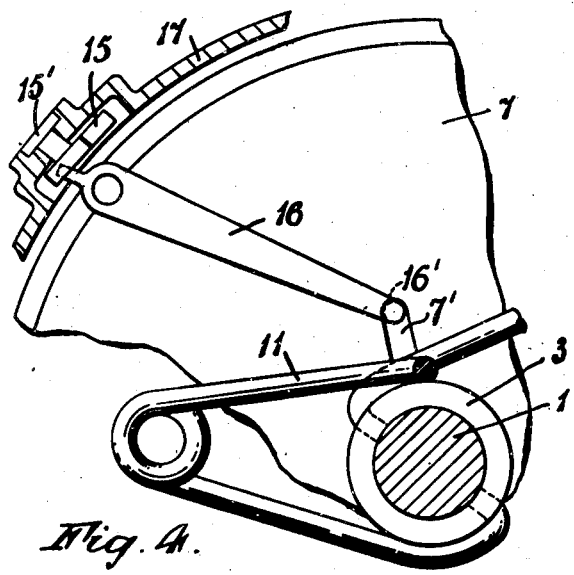
Figure 4 is a fragmentary view of the auxiliary end showing the auxiliary springs and rack levers.
Figures 6, 7:
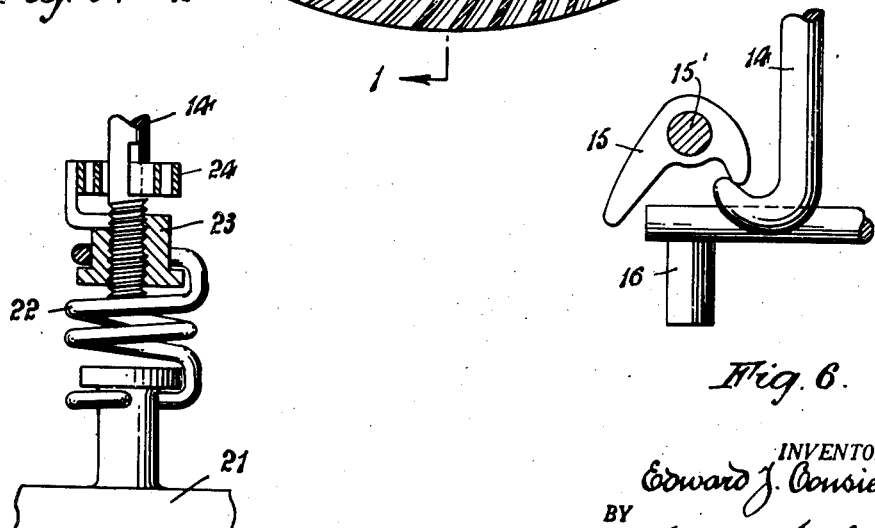

Figure 5 indicates the circumference of the driving worm developed into a flat plane to show the spiral formed on the hub by the ends of the springs;

Figure 6 is a plan view of a converting link in the preferred type of rack action illustrated in Figure 4; and Figure 7 is a detail view of a modified construction, partly in section, of a brake controlling movement of one of the hypoid gears.

Similar characters of reference indicate similar parts in the several figures of the drawings.

Figure 2:
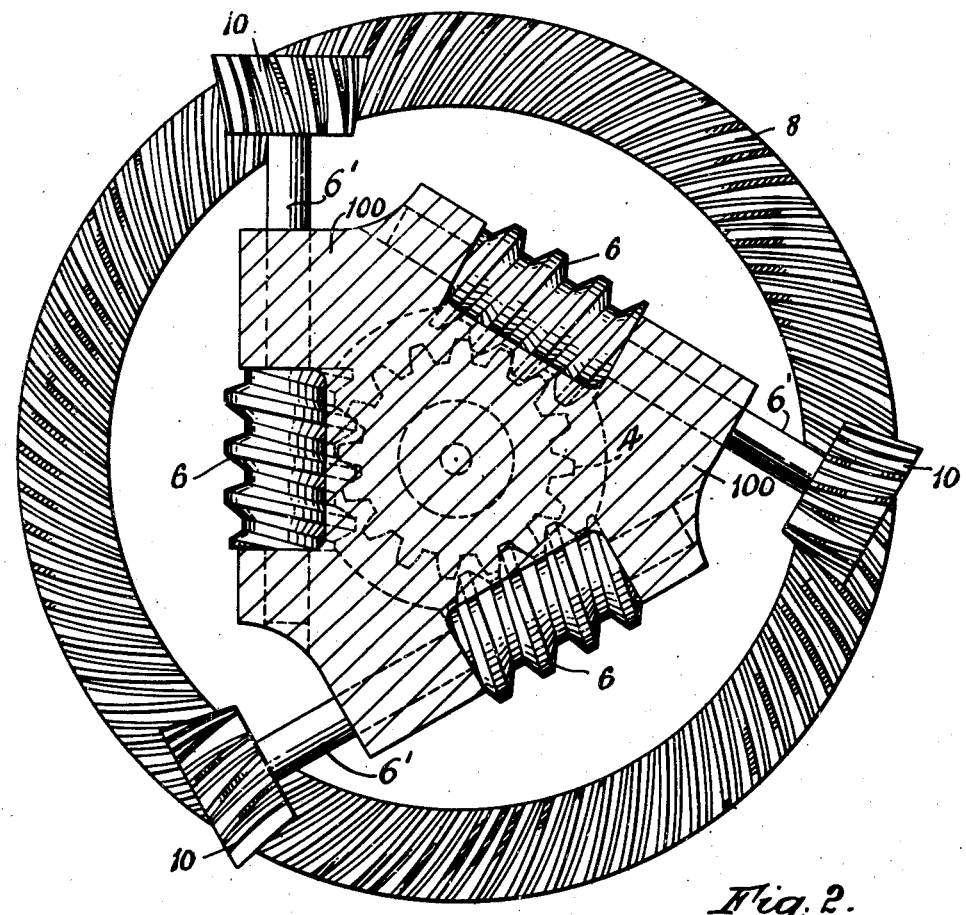
Figure 2 is a transverse section of the same taken on a plane indicated by the line 2—2 in Figure 1.

In the drawings:

1 is a drive or power shaft with a flange or spider 100 formed on the inner end thereof, said spider carrying three worms 6, with their axes forming a triangle about the axis of the said shaft as clearly shown in Figure 2 of the drawings. The spider 100 is hereinafter referred to as the driving spider.

Figure 3:
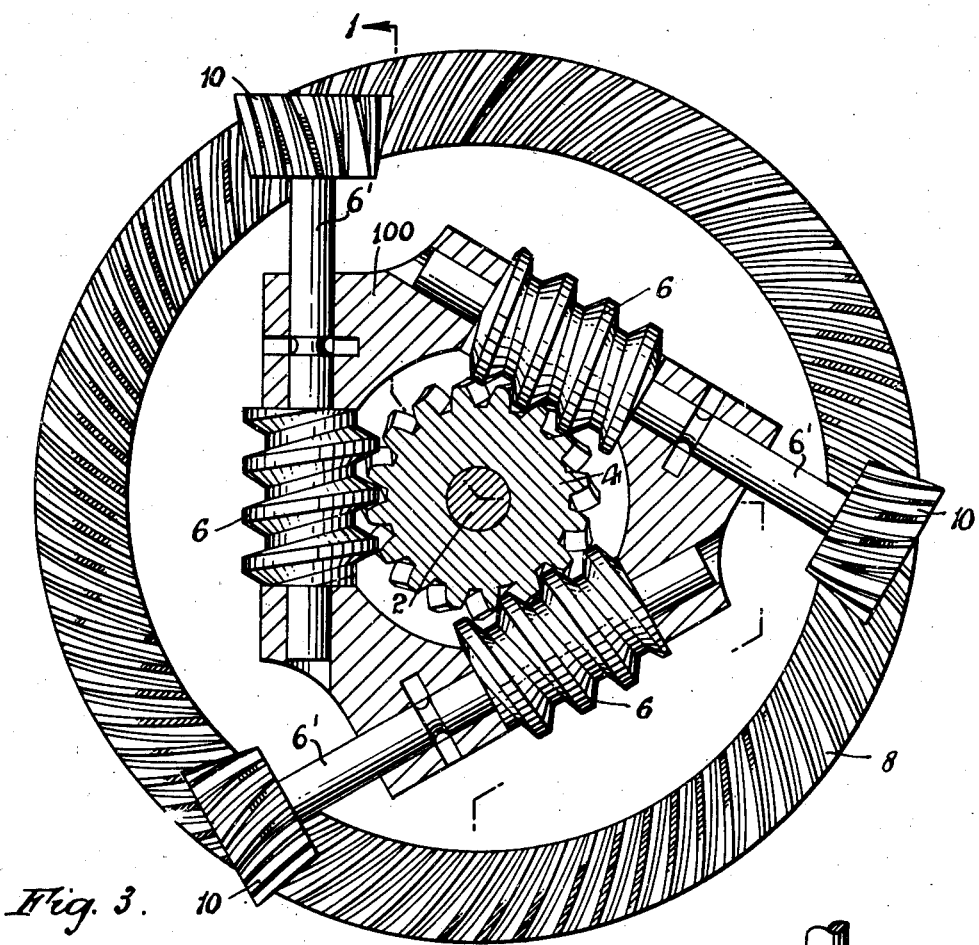
Figure 3 is a similar transverse section taken on a plane indicated by the line 3—3 in Figure 1.

2 is the driven shaft the inner end of which freely rotates and centers in the end of the shaft 1 of the driving spider. 3 is the auxiliary worm gear mounted for free rotation on the shaft 1, and 4 is the driving worm gear similarly mounted for free rotation on the driven shaft 2. A set of worms 6 are positioned around the worm gear 4 and journalled in the spider 100 as best illustrated in Figure 3. A second set of worms 5, similarly positioned and supported by the spider 100, meshes with the second worm gear 3.

7 is a hypoid type of gear functioning as a rack and hereinafter referred to as the auxiliary rack, while 8 is a second hypoid type of gear functioning as a rack on the driven end of the assembly and hereinafter referred to as the driven rack. 9 are pinions secured to worm shafts 5' and said pinions are in mesh with hypoid 7, and 10 are pinions secured to the shafts 6' of the worms 6, the said pinions 10 being in mesh with the hypoid 8.

11 are sets of springs diametrically opposite each other. Said springs are shown as being of the lever type, coupled together. One end of each set is secured to the casing 17 of the assembly the other end of each set secured to the worm gear 3, hereinafter referred to as the auxiliary springs.

12 are two sets of springs similar to the springs 11. One end of each set 12 is secured in the worm gear 4, and the other end thereof secured in the hub of the rack 8. The ends of springs 12 secured in the worm gear 4 form two helix shoulders halfway around the hub of worm gear 4.

13 are two lugs diametrically opposite each other and free to move axially in slots on the hub of rack 8. One end of each of said lugs bears against the helix shoulder of the adjacent spring 12 on the hub of worm gear 4, the other end abuts the hub of a U-shaped frame 14 the hub or center portion of which is freely journalled on the shaft 2.

15 are pawl-like bell crank levers with a shaft 15' secured in the casing 17. Said levers 15 are hereinafter referred to as the converting links. 16 are levers also pivoted in the casing 17. Said levers move rack 7 by virtue of offset ends 16' engaging in slots 7' provided in the body of the said rack 7.

17 is the casing to hold the assembly, and 20 are lugs secured in the casing 17 to keep the frame 14 from rotating on the shaft 2.

Referring now to the construction shown in Figure 7, 21 is a circular brake to control movement of rack 7. There are two extensions on this circular brake diametrically opposite each other, said extensions being connected to coil springs 22, which connect the brake 21 to the sleeve 23. These sleeves 23 are internal threaded sleeves for adjusting tension in the springs 22.

24 are springs secured to the frame 14 and to the sleeves 23. Tension in these springs turn 23 so as to maintain the tension set up in the springs 22 as the brake 21 wears as through friction.

*Description of operation*

As movement of the shaft 1 commences in starting, the integral spider 100 rotates carrying the worms 6 circumferentially around the worm gear 4. Rotation of the worm gear 4 is transmitted through the springs 12 to urge rotation of the now stationary driven shaft 2.

Since rack 8 is keyed to shaft 2, said rack is also motionless during this process. As the driving spider 1 rotates in relation to the motionless rack 8, the pinions 10 rotate on their axes as they are carried around the rack 8 by the spider 1, and the worms 6 consequently rotate in mesh with the worm gear 4. This rotation of the worms 6 on their axes will build up tension in the springs 12 to a point which will start shaft 2 moving in a manner now to be described.

The pitch of the threads on worms 6 is of such hand and angle as to allow the worm to be carried circumferentially with the driving spider 100 and at the same time produce a slower motion of the worm gear in the same direction of rotation as the said driving spider 100. Thus a great ratio of torque can be generated in a minimum amount of space with a minimum amount of gearing in comparison with spur gear speed reduction.

As inertia is overcome and momentum of shaft 2 is being established, resistance on the said shaft 2 becomes less, therefore the resulting greater tension force in the spring 12 will act on the shaft 2 to accelerate its rotation.

It will be described later why the force in the springs 12 will act only on the shaft 2 producing the automatic acceleration. As the rack 8 is keyed to shaft 2, the rack 8 will move faster as shaft 2 accelerates. As said rack 8 moves faster in relation to the spider 100, the pinions 10 which are in mesh with 8 reverse their axial rotation through action of the springs 12. When expansion of the springs 12 has taken place the speed of rotation of shaft 2 is synchronized with that of shaft 1. When thus synchronized, the assembly becomes a direct drive unit.

Although the transmission will function with the parts and in the manner described above, the drawings illustrate an additional torque boosting device comprising rack 7, gear 9, worm 5, worm gear 3, and spring 11 and is energized through movement of the frame 14 in a way to be described.

The spider 100 carrying the shaft 5 produces rotation of the gear 9 around the normally stationary rack 7. The worm 5 on the connecting shaft 5' is so pitched that the worm gear 3 is also normally stationary, the shaft 5' rotating on its axis with movement of the spider 100, but producing no rotation of the rack 7 or the worm gear 3. It will be seen now that any rotational movement of the rack 7 will be transmitted to the worm gear 3 and result in tension of the spring 11 urging the gear 3 back toward its original position. If the rack 7 is now held stationary, the tension of the spring 11 acting through the worm gear 3 will tend to cause the gear 5 to rotate faster than its rotation caused by the rotation of the spider 100. This force acts through the journals of the shafts 5' tending to increase rotation of the spider 100 and thereby increase its effective torque.

When the driven worm gear 4 rotates about the driven shaft 2 under the influence of driving shaft 1 and the resistance of the shaft 2, the helix shoulders formed by inner ends of springs 12 on the hub of the worm gear 4 push the pins 13 through openings in the rack 8 which rack drives the driven shaft 2. The other ends of the pins 13 abut against the U-shaped frame 14 which is slidable on shaft 2 and is pushed along on shaft by the movement of the pins 13. This movement of the frame 14 operates bell crank 15 which in turn moves lever 16 which also in turn moves the auxiliary rack 7.

This partial movement of rack 7 in relation to the stationary member or casing 17 changes the speed of rotation of the auxiliary worms as they are carried around the rack 7 by the driving shaft 1 and spider 100, and this change in rotational speed of the worms causes movement of the auxiliary worm gear 3 thus creating tension in the auxiliary springs 11.

One end of this main spring 12 acts on the driven shaft 2 and the other end acts on the driven main worm gear 4, thereby producing a reaction against the driving spider 100. Thus, with pressure of the auxiliary springs 11 to offset the reaction of the main springs 12, greater torque is possible than would be the case without the auxiliary elements referred to.

The auxiliary rack 7 is returned to its normal position and the tension of the auxiliary springs 11 will be released when the driven rack 8 moves faster in relation to the driven worm gear 4 as a result of the main springs 12 expanding as resistance torque is reduced and the driven shaft 2 gains speed.

Since the scope of the invention does not limit itself to the preferred type of auxiliary rack action, Figure 7 illustrates a brake to control movement of rack 7 when a type of mechanism is used wherein the pitch or the auxiliary worm 5 is designed to generate a movement around the worm gear 3 when rack 7 is held motionless.

Therefore, when the auxiliary force is not needed the rack 7 is allowed rotational movement.

To hold the rack motionless, the motion on frame 14 pulls a brake 21 against the rack 7. When said brake is released, the rack 7 will move as the worm 5 idles around the worm gear 3. Tension in spring 22, when not acted upon by 14, is the proper amount to somewhat restrain the movement of the rack 7. In this type of auxiliary rack action, the frame 14 moves under the same condition and in the same manner as it does in the preferred auxiliary rack action.

This invention may be developed within the scope of the following claims without departing from the essential features of the said invention, and it is desired that the specification and drawings be read as being sincerely illustrative of a suggested embodiment of the invention and not in a strictly limiting sense.

What I claim is:

1. In a transmission of the type described, a driving shaft, a driven shaft, a series of worms tangential to and carried by said driving shaft, a hypoid-type rack carried by said driven shaft, pinions coaxial with and coupled to rotate said worms, said pinions being meshed with said rack, a worm wheel journalled on said driven shaft in mesh with said worms, and a resilient yielding coupling between said worm gear and said driven shaft to provide for partial rotation of said worm wheel on the driven shaft in relation to said rack.

2. In a transmission of the type described, a driving shaft, a driven shaft, a series of worms tangential to and carried by said driving shaft, a hypoid-type rack carried by said driven shaft, pinions coaxial with and coupled to rotate said worms, said pinions being meshed with said rack, a worm wheel journalled on said driven shaft in mesh with said worms, a resilient yielding coupling between said worm gear and said driven shaft to provide for partial rotation of said worm wheel on said driven shaft in relation to said rack, an auxiliary normally stationary hypoid-type rack mounted to allow partial rotation about the axis of said driving shaft by action of cam and lever means coacting with said resilient means, a second worm wheel journalled on said driving shaft, a second series of worms tangential to and carried by said driving shaft, pinions coaxial with and coupled with said second series of worms, a stationary member, and a second resilient yielding means coupling said stationary member and said second worm wheel whereby said second resilient yielding means may be tensioned to apply additional torque to said driving shaft.

3. In a transmission of the type described, a driving shaft, a driven shaft, a series of worms tangential to and carried by said driving shaft, a hypoid-type rack carried by said driven shaft, pinions coaxial with and coupled to rotate said worms, said pinions being meshed with said rack, a worm wheel journalled on said driven shaft in mesh with said worms, a resilient yielding coupling between said worm gear and said driven shaft to provide for partial rotation of said worm wheel on said driven shaft in relation to said rack, an auxiliary normally stationary hypoid-type rack mounted for rotation about the axis of said driving shaft, a second worm wheel also journalled on said driving shaft, worm-and-pinion means journalled on said driving shaft, worm-and-pinion means also carried by said driving shaft coupling said second worm wheel with said auxiliary rack, a stationary member, a resilient yielding coupling between said stationary member and said second worm wheel to provide for partial rotation of said second worm wheel in relation to said stationary member, and means for imparting partial rotation to said auxiliary rack to modify rotational speed of said auxiliary worms during flexing of said first-mentioned resilient yielding coupling.

EDWARD J. CONSIER.

REFERENCES CITED

The following references are of record in the file of this patent:

UNITED STATES PATENTS

| Number | Name | Date |
|---|---|---|
| 1,486,565 | Carling | Mar. 11, 1924 |
| 1,860,010 | Bourquin | May 24, 1932 |
| 1,895,888 | Lotts | Jan. 31, 1933 |
| 1,904,319 | Marolf | Apr. 18, 1933 |